Dec. 25, 1956  J. McEWAN  2,775,146
SAW SHARPENER
Filed Feb. 25, 1953

INVENTOR.
JAMES McEWAN
BY Harper Allen
ATTORNEY

United States Patent Office 2,775,146
Patented Dec. 25, 1956

2,775,146

SAW SHARPENER

James McEwan, San Jose, Calif.

Application February 25, 1953, Serial No. 338,669

1 Claim. (Cl. 76—79)

The present invention relates to saw sharpeners and is concerned more particularly with the provision of a holder or clamp for circular saws and similar devices which can be quickly installed and removed and in which the saw holder provides for easy adjustment of the saw during sharpening.

It is a general object of the invention to provide a fast acting holder for devices such as saws which does not require care in clamping the saw securely in place for free rotation.

A further object of the invention is to provide a saw holder of the fast acting ratchet type in which the saw clamping elements move with the saw during its rotative adjustment.

Other objects and advantages of the invention will be apparent from the following description of the preferred embodiment thereof, as illustrated in the accompanying drawings, in which.

Figure 1:
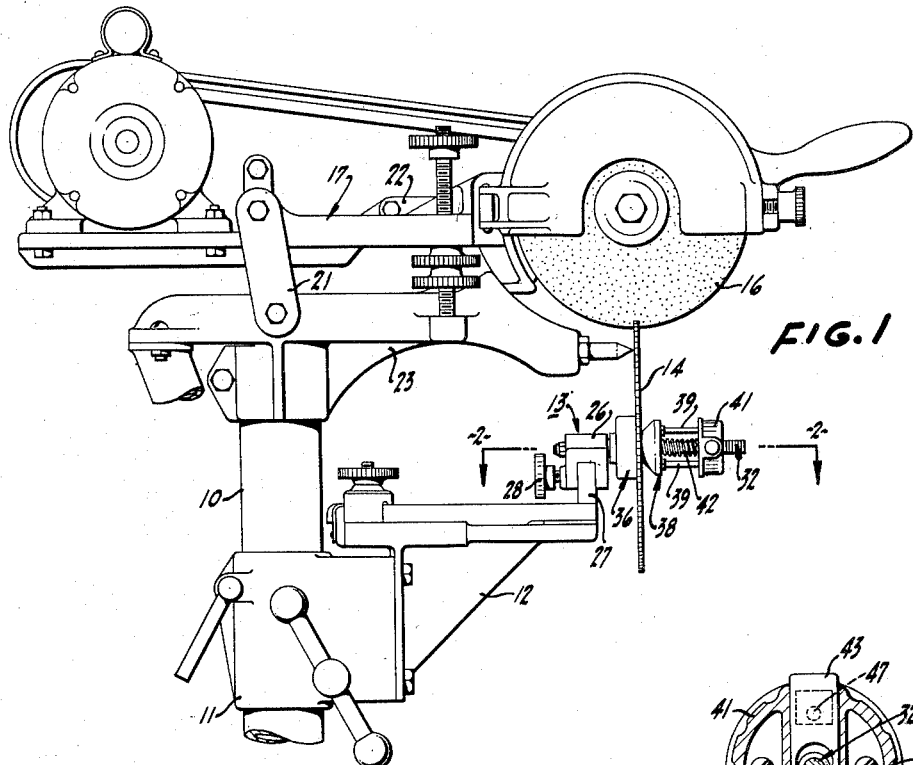
Figure 1 is a side elevational view of the upper portion of a saw sharpener employing the saw holder of the instant invention.
Figure 4:
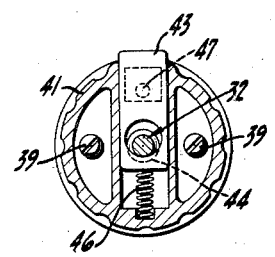
Figure 4 is a detail sectional view of the clamping structure taken as indicated by the line 4—4 in Figure 3.
Figure 2:
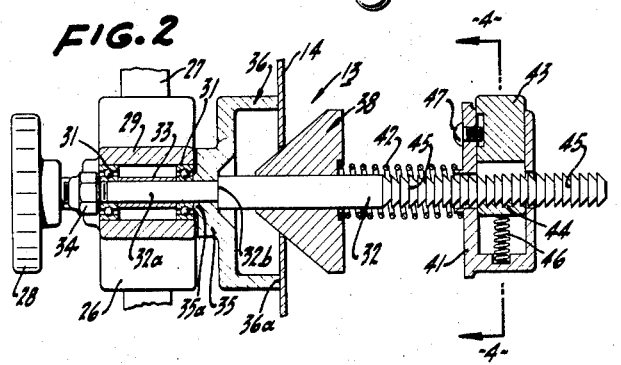
Figure 2 is a horizontal sectional view of the saw holder taken as indicated by the line 2—2 in Figure 1.

Referring to Figure 1, there is illustrated a saw sharpener including a supporting post 10 on which there is adjustably mounted a support casting 11 for an adjustable bracket 12 on which the saw holder 13 is mounted with the saw 14 shown in place thereon. The saw sharpener as illustrated also includes a sharpening wheel 16 carried by a bracket 17 is supported and connected by respective links 21 and 22 on a dust chute 23 at the top of the post 10. The saw sharpener is of the construction described and claimed in my Patent No. 2,590,992 for a Saw Sharpener.

Referring to the saw holder in detail, the holder includes a support device 26 of the cast construction which is grooved to slide on a bar 27 of the bracket 12 and is secured in adjusted position thereon by a screw 28. The support device 26 includes a horizontally disposed boss 29 in which respective bearings 31 are mounted to journal the reduced end 32a of a support shaft 32. A spacer sleeve 33 is interposed between the inner races of the bearing 31. The reduced shaft end 32a is threaded to receive a nut 34 of the self-locking type which engages the inner race of one bearing 31 and the inner race of the other bearing 31 abuts an annular extension 35a of a mounting boss 35 of a cup-shaped clamping member 36. The other face of the boss 35 abuts a shoulder 32b of the shaft 32 so that the clamping member 36, the inner races of the bearings 31 and the sleeve 33 are held by the nut 34 securely on the shaft for rotation therewith. The cup-shaped clamping member 36 provides an annular face or abutment 36a for engagement by the saw 14.

To hold the saw against the clamping face or abutment 36a, the clamping structure includes a saw engaging cone 38 slidably and rotatably mounted on the shaft 32 in free detachable fashion. The cone 38 carries a pair of connecting bolts 39 slidably secured in a recessed securing element or collar 41 which is also slidable and rotatable with respect to the shaft 32. The bolts 39 limit relative outward movement between the cone 38 and the collar 41 while permitting adjustment of the parts toward each other. A spring 42 is interposed between the cone 38 and the collar 41 to urge them apart and to urge the cone 38 and the saw 14 thereon toward the abutment 34a. The collar 41 is provided with a radial recess intersecting its center aperture and receiving a ratchet button 43 apertured to engage over the shaft 32. The button 43 is provided with ratchet teeth 44 for engagement with a series of annular ratchet teeth 45 of the support shaft 32 under the influence of a compression spring 46 seated in the collar 41. A pin which may take the form of a screw 47 in the collar 41 engages a suitable slotted recess in the button 43 to maintain the button within the collar 41.

Figure 3:
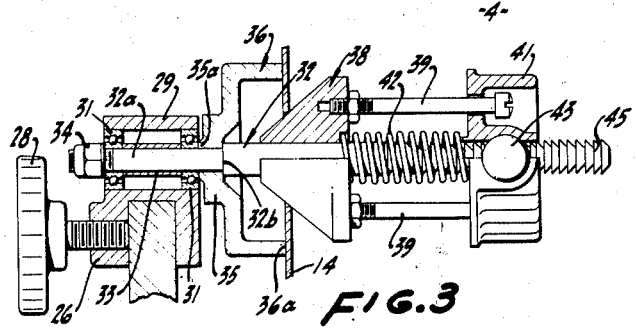
Figure 3 is an enlarged elevational view, partially in section, of the clamping structure of the saw holder.

As shown in Figure 3, the ratchet teeth 44 of the securing element are engaged with the ratchet teeth 45 of the shaft 32 so that the cone 38 is urged by the spring 42 to engage in the central hole of the saw 14 and to clamp the saw against the abutment 36a. To release the saw and remove the clamping structure, the button 43 is depressed to free the teeth 44 from the teeth 45 so that the entire clamping structure can be freely withdrawn as a unit from the shaft 32. If additional spring pressure is desired in holding the saw 14 in place, the securing collar 41 is moved to the left as viewed in Figure 3 on the shaft 32 so that it will be secured in a more adjacent position to the cone 38 and provide additional compression of the spring 42.

It will be noted that the entire clamping structure is mounted for free rotation with the shaft 32 so that the operator can easily move the saw while it is being sharpened. This practice is common with operators of saw sharpeners to avoid overheating of the tooth being sharpened and to control the sharpening operation. Also because of the combining of a free rotatable mounting of the clamping structure including the cone 38 and the cup-shaped member 36 with a quick-attachable mounting of the cone 38, the amount of compression placed on the spring 42 need not be carefully adjusted in installing a saw. This in effect provides a faster method of installing a saw and consequently reduces the time of the sharpening operation.

While I have shown a preferred embodiment of the invention, it will be understood that the invention is capable of variation and modification from the form shown so that its scope should be limited only by the scope of the claims appended hereto.

I claim:

In a saw holder, a support member having a boss, a support shaft journalled in said boss, a clamping structure carried by said shaft for rotation therewith to hold a saw, said structure including a recessed clamping element presenting an annular face to the saw and a saw clamping cone slidably mounted on said shaft for engaging a saw and holding it against said annular face in centered relation with respect to said shaft, a series of ratchet teeth on said shaft, a ratchet collar slidably mounted on said shaft including means for engaging said teeth, and a spring interposed between said collar and said cone.

References Cited in the file of this patent
UNITED STATES PATENTS

| | | |
|---|---|---|
| 1,966,364 | Thrasher | July 10, 1934 |
| 2,463,007 | Wheeler | Mar. 1, 1949 |
| 2,580,812 | McEwan | Jan. 1, 1952 |